US006956946B1

(12) United States Patent
Hess et al.

(10) Patent No.: US 6,956,946 B1
(45) Date of Patent: Oct. 18, 2005

(54) METHOD AND DEVICE FOR CRYPTOGRAPHIC PROCESSING WITH THE AID OF AN ELLIPTIC CURVE ON A COMPUTER

(75) Inventors: Erwin Hess, Ottobrunn (DE); Jean Georgiades, München (DE)

(73) Assignee: Infineon Technologies AG, Munich (DE)

( * ) Notice: Subject to any disclaimer, the term of this patent is extended or adjusted under 35 U.S.C. 154(b) by 1111 days.

(21) Appl. No.: 09/641,868

(22) Filed: Aug. 18, 2000

Related U.S. Application Data

(63) Continuation of application No. PCT/DE99/00278, filed on Feb. 2, 1999.

(30) Foreign Application Priority Data

Feb. 18, 1998 (DE) ................................ 198 06 825

(51) Int. Cl.[7] ................................................ H04L 9/30

(52) U.S. Cl. .......................... 380/30; 380/46; 713/171; 713/180; 713/176

(58) Field of Search .............................. 380/30, 28, 46, 380/37, 262, 278; 712/168–172, 180–183, 712/176; 708/491, 492; 713/171, 176, 180

(56) References Cited

U.S. PATENT DOCUMENTS 5,442,707 A 8/1995 Miyaji et al.
5,497,423 A 3/1996 Miyaji

FOREIGN PATENT DOCUMENTS

DE 33 23 268 A1 10/1985
RU 2 007 884 C1 2/1994

OTHER PUBLICATIONS

Atsuko Miyaji, Takatoshi Ono and Henri Cohen. Efficient eliptic curve exponentiation. Nov. 1997. Proceedings of the First International Information and Communications Security Conference. pp. 282-290.*

Alfred Menezes: "Elliptic curve public key cryptosystems", *Kluwer Academic Publishers*, Norwell, MA, 1993, pp. 83-116.

Christoph Ruland: "Informationssicherheit in Datennetzen" [information security in data networks], *DATACOM-Verlag, Bergheim, Germany*, 1993, pp. 72-85.

Rudolf Lidl et al.: "Introduction to finite fields and their applications", *Cambridge University Press, Cambridge, Great Britain*, 1986, pp. 1-73.

Atsuki Miyaji: "Elliptic Curves Suitable for Cryptosystems", *IEICE Transactions on Fundamentals of Electronics, Communications and Computer Sciences*, vol. #77-A, Jan. 1994, No. 1, pp. 98-104.

Neal Koblitz: "A course in number theory and cryptography", *Springer Verlag, New York, NY*, 1987, pp. 150-179.

* cited by examiner

*Primary Examiner*—Andrew Caldwell
*Assistant Examiner*—Tamara Teslovich
(74) *Attorney, Agent, or Firm*—Laurence A. Greenberg; Werner H. Stemer; Ralph E. Locher

(57) ABSTRACT

In the case of cryptographic processing with the aid of an elliptic curve, parameters of the elliptic curve are stored in a memory of a computer. These parameters are each of substantial length. The elliptic curve is transformed in order to shorten at least one parameter significantly in length and to ensure that the high security level is unchanged in the process. One parameter is preferably shortened to 1, −1, 2 or −2 with the aid of an algorithm, whereas the other parameters have a length of several 100 bits. The shortening of even one parameter is clearly reflected in the case of devices which have little memory space.

13 Claims, 4 Drawing Sheets

FIG 4
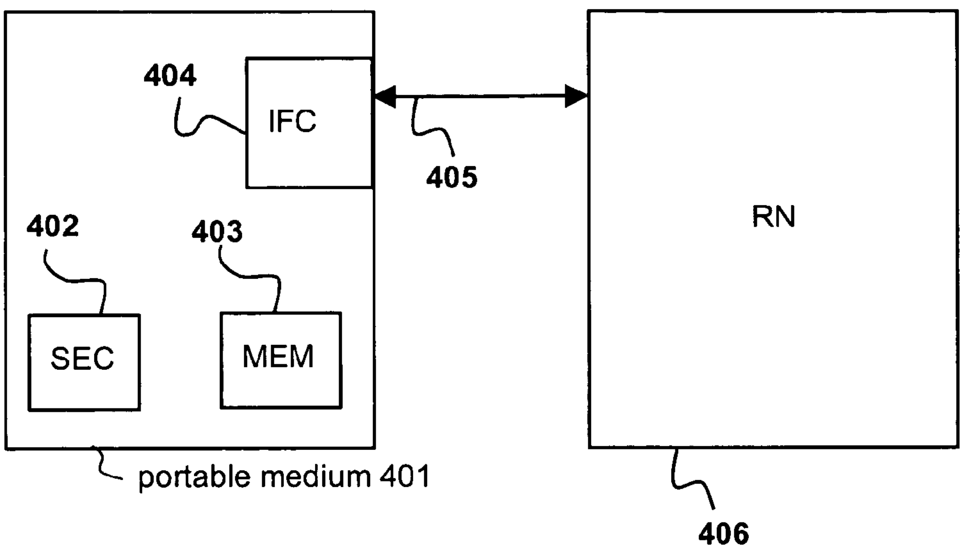
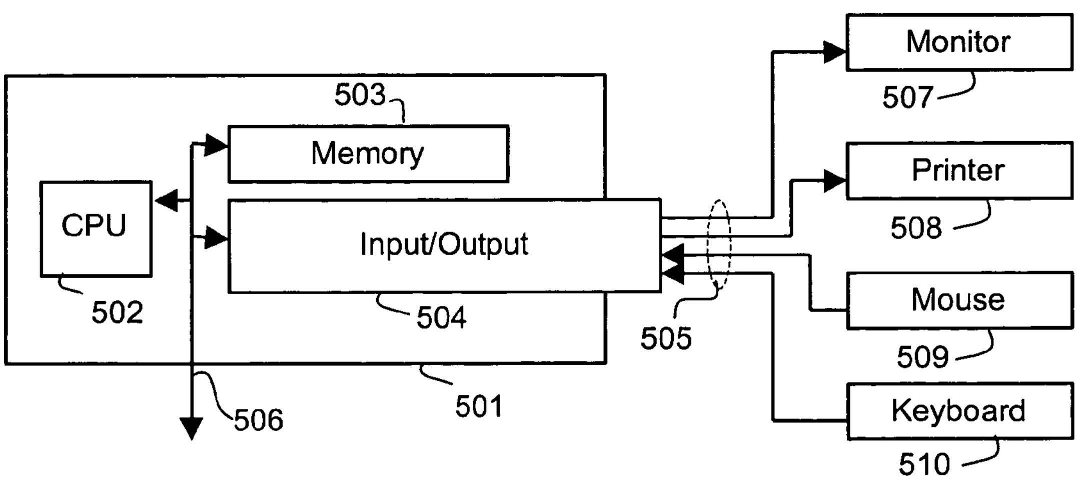
FIG 5

METHOD AND DEVICE FOR CRYPTOGRAPHIC PROCESSING WITH THE AID OF AN ELLIPTIC CURVE ON A COMPUTER

CROSS-REFERENCE TO RELATED APPLICATION

This is a continuation of copending International Application PCT/DE99/00278, filed Feb. 2, 1999, which designated the United States.

BACKGROUND OF THE INVENTION

Field of the Invention

The invention relates to a method and a device for cryptographic processing with the aid of an elliptic curve on a computer.

A finite body is called a finite field. Reference may be made to Lidl and Niederreiter: Introduction to Finite Fields and Their Applications, Cambridge University Press, Cambridge 1986, ISBN 0-521-30706-6, p. 15, 45, concerning the properties and definition of the finite field.

Increasingly growing demands are being placed on data security with the wide dissemination of computer networks and associated applications which are being developed over electronic communication systems (communications networks). The aspect of data security takes account of, inter alia, the possibility of a failure of data transmission;

the possibility of corrupted data;

the authenticity of the data, that is to say the possibility of establishing, and the identification of a sender; and the protection of the secrecy of the data.

A "key" is understood as data which are used in cryptographic processing. It is known from public-key methods to use a secret and a public key. Reference is had, in this context, to Christoph Ruland: Informationssicherheit in Datennetzen [Information Security in Data Networks], DATACOM-Verlag, Bergheim 1993, ISBN 3-892238-081-3, p. 73–85.

An "attacker" is defined as an unauthorized person who aims at obtaining the key or breaking the key.

Particularly in a computer network, but increasingly also in portable media, for example a mobile telephone, a chip card or smart card, it is to be ensured that a stored key also cannot be accessed when an attacker takes over the computer, the mobile telephone or the chip card.

In order to ensure adequate security of cryptographic methods, keys, in particular in the case of asymmetric methods, are respectively determined with lengths of several 100 bits. A memory area of a computer or portable medium is mostly of meager dimension. A length of a key of several 100 bits stored in such a memory area reduces the free memory space on the computer or the medium, such that only a few such keys can be stored at the same time.

An elliptic curve and its use in cryptographic processing are known in the literature, for example: Neal Koblitz: A Course in Number Theory and Cryptography, Springer Verlag, New York, 1987, ISBN 0-387-96576-9, p. 150–79; and Alfred J. Menezes: Elliptic Curve Public Key Cryptosystems, Luwer Academic Publishers, Massachusetts 1993, ISBN 0-7923-9368-6, p. 83–116.

SUMMARY OF THE INVENTION

The object of the invention is to provide a method and device for cryptographic processing with an elliptic curve on a computer which overcomes the above-noted deficiencies and disadvantages of the prior art devices and methods of this kind, and which requires less memory space.

With the above and other objects in view there is provided, in accordance with the invention, a method of cryptographic processing on a computer, which comprises the steps of:

prescribing an elliptic curve in a first form, the elliptic curve having a plurality of first parameters;

transforming the elliptic curve into a second form $$y^2=x^3+c^4ax+c^6b$$

by determining a plurality of second parameters, wherein at least one of the second parameters is shortened in length by comparison with the first parameter;

wherein x,y are variables;

a,b are the first parameters; and c is a constant;

wherein at least the parameter a is shortened by selecting the constant c such that $c^4a \bmod p$ is determined to be significantly shorter than a length of the parameter b and the length of the prescribed variable p; and determining the elliptic curve in the second form for cryptographic processing.

A method for cryptographic processing with the aid of at least one elliptic curve on a computer is specified, in the case of which the elliptic curve is prescribed in a first form, several first parameters determining the elliptic curve in the first form. The elliptic curve is transformed into a second form by determining several second parameters, at least one of the second parameters being shortened in length by comparison with one of the first parameters. The elliptic curve after the transformation, that is to say in the second form, is used for the cryptographic processing.

The significant shortening of one of the first parameters yields a saving of a memory area which is to be provided for this parameter. Since the memory area, for example on a chip card, is of tight dimension, free memory space is achieved for each shortened parameter by means of the saving of several 100 bits, for example for storing a further secret key. The security of the cryptographic method is ensured nevertheless by the shortening of the respective parameter.

In the case of the use of an elliptic curve in a cryptographic method, the outlay for an attacker to determine the key rises exponentially with its length.

In accordance with an added feature of the invention, the first form of the elliptic curve is defined by $$y^2=x^3+ax+b \text{ over } GF(p) \tag{1}$$

wherein

GF(p) denotes a finite field with p elements; and x,y,a,b denoting elements of the body GF(p).

Designation "mod p" as used in this text denotes a special case for the finite field, specifically the natural numbers smaller than p. The term "mod" stands for MODULO, and comprises an integral division with remainder.

The second form, as noted above, of the elliptic curve is determined by $$y^2=x^3+c^4ax+c^6b \text{ over } GF(p) \quad (2)$$

where c is a constant.

In order to save memory space, Equation (1) is transformed into Equation (2), and a variable characterizing the elliptic curve in accordance with Equation (2) is shortened.

The invention is preferably integrated in cryptographic encoding, cryptographic decoding, key allocation, encoding in a digital signature, verification of the digital signature, and in asymmetrical authentication, that is:

Encoding and Decoding:

Data are encoded by a sender—by means of symmetrical or asymmetrical methods—and decoded at the other end at a receiver.

Key Allocation by a Certification Authority:

A trustworthy institution (certification authority) allocates the key, it being necessary to ensure that the key comes from this certification authority.

Digital Signature and Verification of the Digital Signature:

An electronic document is signed, and the signature is added to the document. It can be established at the receiver with the aid of the signature whether the desired sender really has signed.

Asymmetric Authentication:

A user can verify his identity with the aid of an asymmetrical method. This is preferably done by coding using a corresponding private key. Using the associated public key of this user, anyone can establish that the code really does come from this user.

Shortening of Keys:

A variant of the cryptographic processing comprises shortening a key, which key can preferably be used for further procedure in cryptography.

With the above and other objects in view there is also provided, in accordance with the invention, a device for cryptographic processing with a processor unit programmed to:

prescribe an elliptic curve in a first form, with a plurality of first parameters determining the elliptic curve;

transform the elliptic curve into a second form $$y^2=x^3+c^4ax+c^6b$$

by determining a plurality of second parameters, at least one of the second parameters being shortened in length by comparison with the first parameter;

wherein x,y are variables;

a,b are the first parameters; and c is a constant;

shorten the at least the parameter a by selecting the constant c such that $c^4a \bmod p$ can be determined to be much shorter than the length of the parameter b and the length of the prescribed variable p; and determine the elliptic curve in the second form for the purpose of cryptographic processing.

In accordance with an additional feature of the invention, the device is embodied as a chip card (smart card) with a memory area, the memory area being adapted to store the parameters of the elliptic curve.

In accordance with a concomitant feature of the invention, the chip card has a protected memory area adapted to store a secret key.

In other words, the device has a processor unit which is set up in such a way that an elliptic curve is prescribed in a first form, several first parameters determining the elliptic curve, and that the elliptic curve is transformed into a second form by determining several second parameters, at least one of the second parameters being shortened in length by comparison with the first parameters. Finally, the elliptic curve is determined in the second form for the purpose of cryptographic processing.

This device can be a chip card which has a protected and a non-protected memory area. Keys, that is to say parameters which characterize the elliptic curve, can be stored both in the protected memory area and in the non-protected one.

This device is particularly suited to carrying out the method according to the invention or one of its developments explained above.

Finally, there is also defined a computer-readable medium which carries the computer-executable instructions for carrying out the above-outlined method.

Other features which are considered as characteristic for the invention are set forth in the appended claims.

Although the invention is illustrated and described herein as embodied in a method and device for cryptographic processing with the aid of an elliptic curve on a computer, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 4 is a diagrammatic view of a system for cryptographic processing; and

FIG. 5 is a schematic view of a processor unit.

DESCRIPTION OF THE PREFERRED EMBODIMENTS

Figure 1:
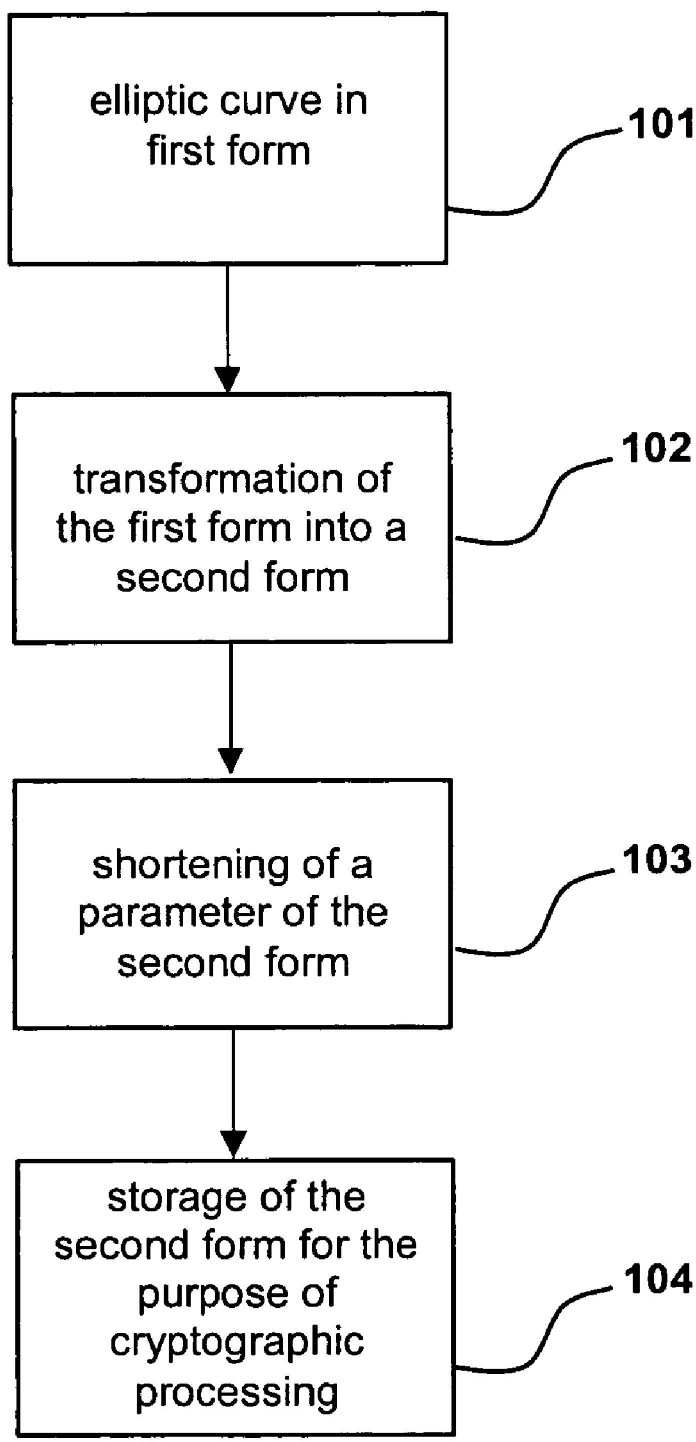
FIG. 1 is a flowchart illustrating a method for cryptographic processing by means of an elliptic curve according to the invention, wherein at least one parameter of the elliptic curve is shortened, which leads to a space savings of a part of the memory area required for the parameters of the elliptic curve.

Referring now to the figures of the drawing in detail and first, particularly, to FIG. 1 thereof, there is illustrated a method for processing by means of an elliptic curve. The elliptic curve is present in a first form in block 101. In block 102, the curve is transformed from the first form into a second form. Then, a parameter of the second form is shortened in block 103, and the second form is stored for the purpose of cryptographic processing in block 104. These steps will be discussed below, with options for shortening being taken by way of example.

The elliptic curve is first given in a first form:

$$y^2=x^3+ax+b \text{ over } GF(p) \qquad (3)$$

The length of the parameter a is reduced in a first step. The parameter p is, in particular, a prime number greater than 3, and GF(p) represents a finite field (Galois field) with p elements.

The elliptic curve $$y^2=x^3+ax+b \text{ over } GF(p) \qquad (4)$$

can be recast by a transformation into a birational isomorphic elliptic curve (elliptic curve in second form, see block 102)

$$y^2=x^3+c^4ax+c^6b \text{ over } GF(p) \qquad (5).$$

The coefficient $$c^4a \text{ or} \qquad (6)$$

$$-c^4a \qquad (7)$$

can be shortened by suitable selection of the constant c (see block 103) with the advantage that the memory space required for storing this coefficient can be small by comparison with the memory space for the parameter a.

The numbers $c^4a$ (or $-c^4a$) and $c^2$ are determined below in accordance with Equation (5).

Determining the Number "$c^4a$"

The following cases are preferably distinguished in order to determine the number $c^4a$ (or $-c^4a$)

a) p 3 mod 4

It holds in these bodies that:

all squares are also fourth powers; and

'−1' is not a square.

Now let p=4k+3 and s be a fourth power which generates the multiplicative subgroup of the fourth powers (or the squares) in GF(p).

By definition

| | |
|---|---|
| $V = \{1, s, s^2, s^3, \ldots, s^{2k}\}$ | is the set of the fourth powers in GF(p) and |
| $NQ = \{-1, -s, -s^2, -s^3, \ldots, -s^{2k}\}$ | is the set of the non-squares in GF(p) |
| 1. For each element | $a = s^t$ from V |
| there exists an element | $c^4 = s^{2k+1-t}$ from V |
| with | $c^{4a} = s^{2k+1} = 1$ in GF(p). |
| 2. For each element | $a = -s^t$ from V |
| there exists an element | $c^4 = s^{2k+1-t}$ from V |
| with | $c^{4a} = -s^{2k+1} = -1$ in GF(p). |

In this case s, t and k denote body elements from GF(p).

For p 3 mod 4, the parameter a can be converted by suitable selection of the constant c into the number $c^4a=1$ in GF(p) or $c^4a=-1$ in GF(p).

b) p 1 mod 4

It holds in such a body that:

(p−1)/4 elements of the multiplicative group of the body are fourth powers;

(p−1)/4 elements of the multiplicative group of the body are squares, but not fourth powers;

(p−1)/2 elements of the multiplicative group of the body are non-squares;

'−1' is not a non-square.

b1) p 5 mod 8

It holds in addition in such a body that:

'−1' is a square but not a fourth power; and

'+2', '−2' are non-squares.

Now let p=8k+5 and s be a fourth power which generates the multiplicative subgroup of the fourth power in GF(p).

By definition

| | |
|---|---|
| $V = \{1,s,s^2,s^3,\ldots,s^{2k}\}$ | is the set of the fourth powers in GF(p) and |
| $Q = \{-1,-s,-s^2,-s^3,\ldots,-s^{2k}\}$ | is the set of squares which are not fourth powers in GF(p), and |
| $NQ = \{2,2s,2s^2,2s^3,\ldots,2s^{2k}, -2,-2s,-2s^2,-2s^3,\ldots,-2s^{2k}\}$ | is the set of non-squares in GF(p). |
| 1. For each element | $a = s^t$ from V |
| there exists an element | $c^4 = s^{2k+1-t}$ from V |
| with | $c^4a = s^{2k+1} = 1$ in GF(p). |
| 2. For each element | $a = -s^t$ from Q |
| there exists an element | $c^4 = s^{2k+1-t}$ from V |
| with | $c^4a = -s^{2k+1} = -1$ in GF(p). |
| 3. For each element | $a = s^t$ from NQ |
| there exists an element | $c^4 = s^{2k+1-t}$ from V |
| with | $c^4a = 2s^{2k+1} -2$ in GF(p). |
| 4. For each element | $a = -2s^t$ from NQ |
| there exists an element | $c^4 = s^{2k+1-t}$ from V |
| with | $c^4a = -2s^{2k+1} = -2$ in GF(p). |

For p 5 mod 8, the parameter a can be converted into the number $$c^4a=1 \text{ or } -1 \text{ or } 2 \text{ or } -2 \text{ in } GF(p)$$

by suitable selection of the constant c.

b2) p 1 mod 8

The number $c^4a$ can be determined according to the following scheme:

For r=1, −1,2, −2,3, −3,4, −4, . . .

form $z=ra^{-1}$ mod p;

calculate $u=z^{(p-1)/4}$ mod p;

terminate if u=1; and store $z=c^4$ and $r=c^4a$.

Determining the Number "$c^2$ in GF(p)"

In order to determine the number $c^2$ mod.p, it is first established in the appropriate body GF(p) whether a is a fourth power, a square but not a fourth power, or a non-square.

a) p=4k+3

The term $u=a^{(p-1)/2}$ in GF(p) is calculated in these bodies.

If u=1 in GF (p), a is a fourth power (or a square). In this case, $C^4=a^{-1}$ in GF (p).

If u=1 in GF(p), a is a non-square. In this case, $c^4=-a^{-1}$ in GF (p).

b) p=8k+5

The term $u=a^{(p-1)/4}$ in GF(p) is calculated in these bodies.

If u=1 in GF(p), a is a fourth power. In this case, $C^4= a^{-1}$ in GF(p).

If u=−1, a is a square but not a fourth power. In this case, $c^4=-a^{-1}$ in GF (p).

If u is neither 1 nor −1 in GF(p), a is a non-square in GF(p). In this case, $v=(2a)^{(p-1)/4}$ in GF(p) is calculated. If v=1 in GF(p), $C^4=2a^{-1}$ in GF(p), otherwise $C^4=-2a^{-1}$ in GF(p).

c) p=8k+1

According to the scheme described in b2) above, $z=C^4$ in these bodies.

The two roots ($C^2$ and $-c^2$) of $c^4$ can be calculated in all three cases with an outlay of O(log p). For the case p=4k+3, only one of the two specified solutions is permissible, specifically that which is a square in GF(p). Both solutions are permissible in the other cases. Coefficient $c^6b$ of the elliptic curve can thus be calculated.

Such prime numbers are to be preferred in practice because of the closed formulas for the cases p=4k+3 and p=8k+5.

EXAMPLE 1

Let the prime number p=11 ⇒Case a: p=3 mod 4

TABLE 1

Squares and fourth powers mod 11

| Number | Squares Q | Fourth powers V |
|---|---|---|
| 1 | 1 | 1 |
| 2 | 4 | 5 |
| 3 | 9 | 4 |
| 4 | 5 | 3 |
| 5 | 3 | 9 |
| 6 | 3 | 9 |
| 7 | 5 | 3 |
| 8 | 9 | 4 |
| 9 | 4 | 5 |
| 10 | 1 | 1 |

The set of the squares Q, the set of the fourth powers V and the set of the non-squares NQ are thereby yielded as:

Q=V=(1,3,4,5,9);

NQ=(2,6,7,8,10).

$a \in V=Q \Rightarrow ac^4=1$

TABLE 2

Determination of $c^4$ for a given parameter a.

| a = | $c^4$ = |
|---|---|
| 1 | 1 |
| 3 | 4 |
| 4 | 3 |
| 5 | 9 |
| 9 | 5 |

$a \in NQ \Rightarrow ac^4 = -1$

TABLE 3

Determination of $c^4$ for a given parameter a.

| a = | $c^4$ = |
|---|---|
| 2 | 5 |
| 6 | 9 |
| 7 | 3 |
| 8 | 4 |
| 10 | 1 |

Table 2 shows various options for a value assignment of a and $c^4$ which always yield 1 in the combination $ac^4$, and Table 3 shows various options for a value assignment of a and $c^4$ which always yield −1 in the combination $ac^4$. This holds in GF(11).

EXAMPLE 2

Let the prime number p=13 ⇒Case b1): p=1 mod 4 and, at the same time, p=5 mod 8

TABLE 4

Squares and fourth powers mod 13.

| Number | Squares Q | Fourth powers V |
|---|---|---|
| 1 | 1 | 1 |
| 2 | 4 | 3 |
| 3 | 9 | 3 |
| 4 | 3 | 9 |
| 5 | 12 | 1 |
| 6 | 10 | 9 |
| 7 | 10 | 9 |
| 8 | 12 | 1 |
| 9 | 3 | 9 |
| 10 | 9 | 3 |
| 11 | 4 | 3 |
| 12 | 1 | 1 |

The set of the squares Q (which are not fourth powers), the set of the fourth powers V and the set of the non-squares NQ are thereby yielded as:

Q=(4,10,12);

V=(1,3,9);

NQ=(2,5,6,7,8,11).

$a \in V \Rightarrow c^4 \in V$

TABLE 5

Determination of $c^4$ for a given parameter a.

| a = | $c^4$ = |
|---|---|
| 1 | 1 |
| 3 | 9 |
| 9 | 3 |

$\Rightarrow ac^4$ 1 mod 13

TABLE 6

Determination of $c^4$ for a given parameter a.

| a = | $c^4$ = | $ac^4$ = |
|---|---|---|
| 4 | 3 | 12 = −1 mod 13 |
| 10 | 9 | 90 = −1 mod 13 |
| 12 | 1 | 12 = −1 mod 13 |

$\Rightarrow ac^4=-1$ mod 13

$a \in NQ$

NQ=(2,5,6,7,8,11), with

2*V=(1,5,6) and

2*Q=(7,8,11)

Case a: $a \in NQ$ and $a \in (2*V)$

TABLE 7

Determination of $c^4$ for a given parameter a.

| a = | $c^4$ = | $ac^4$ = |
|---|---|---|
| 2 | 1 | 2 = 2 mod 13 |
| 5 | 3 | 15 = 2 mod 13 |
| 6 | 9 | 54 = 2 mod 13 |

$\Rightarrow ac^4=2 \bmod 13$

Case b: $a \in NQ$ and $a \in (2*Q)$

TABLE 8

Determination of $c^4$ for a given parameter a.

| a = | $c^4$ = | $ac^4$ = |
|---|---|---|
| 7 | 9 | 63 = −2 mod 13 |
| 8 | 3 | 24 = −2 mod 13 |
| 11 | 1 | 11 = −2 mod 13 |

$\Rightarrow ac^4=-2 \bmod 13$

The elliptic curve obtained in the manner described in the second form (see block 103) is used for the purpose of cryptographic processing.

Figure 2:
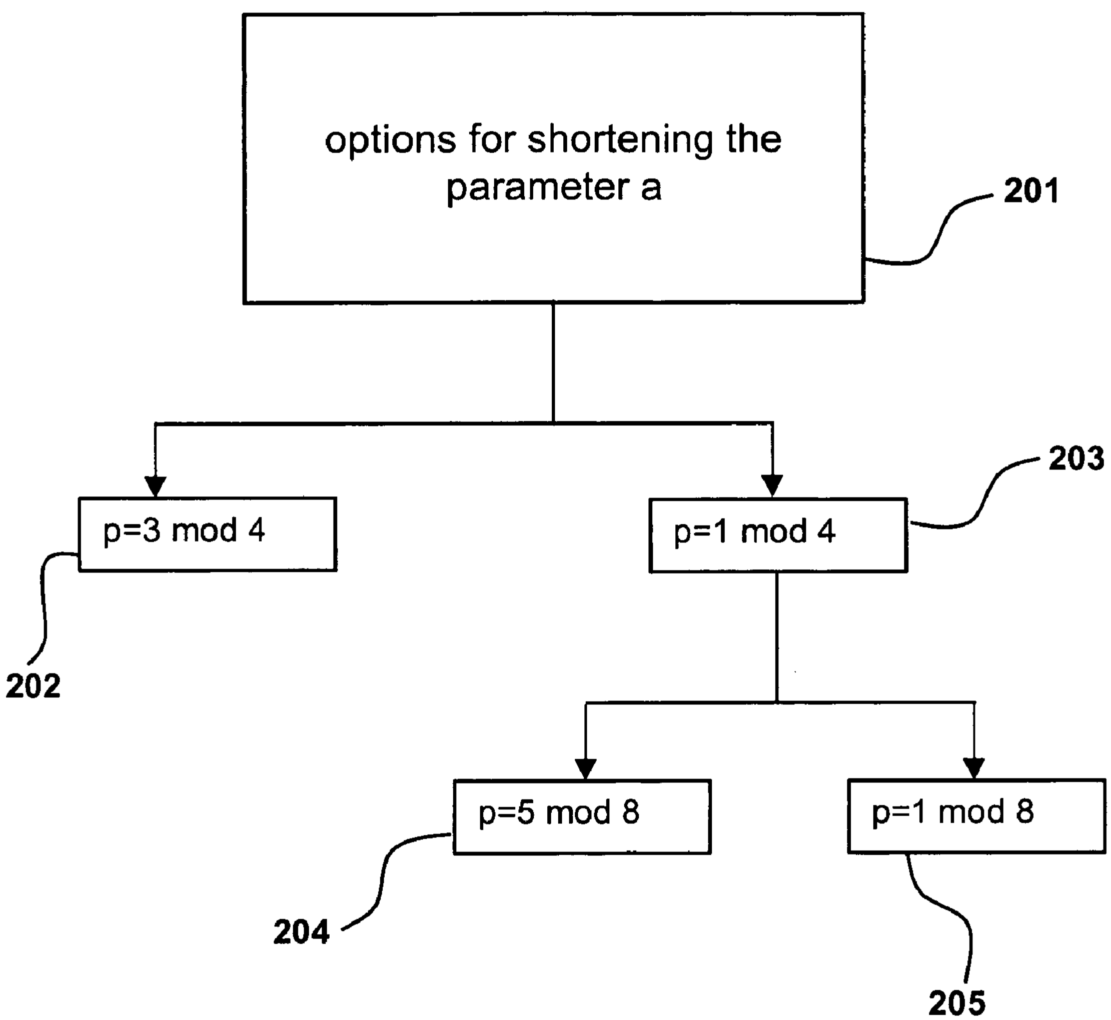
FIG. 2 is a flowchart showing a selection of options for the prime number p such that the parameter a of the elliptic curve is shortened.

Referring now to FIG. 2, there is shown a range of options for the selection of the prime number p for the purpose of shortening the parameter a (see block 201), as described above. The option 202 determines p in such a way that p=3 mod 4 holds. In this case, the parameter a can be shortened with the aid of the mode of procedure described above. The same holds for p=1 mod 4 (Case 203), two cases p=5 mod 8 (Case 204) and p=1 mod 8 (Case 205) being advanced separately to distinguish them. The closed formulations for determining a shortened parameter a are likewise set forth above. FIG. 2 shows explicitly a selection of options without attempting to claim a comprehensive selection.

Figure 3:
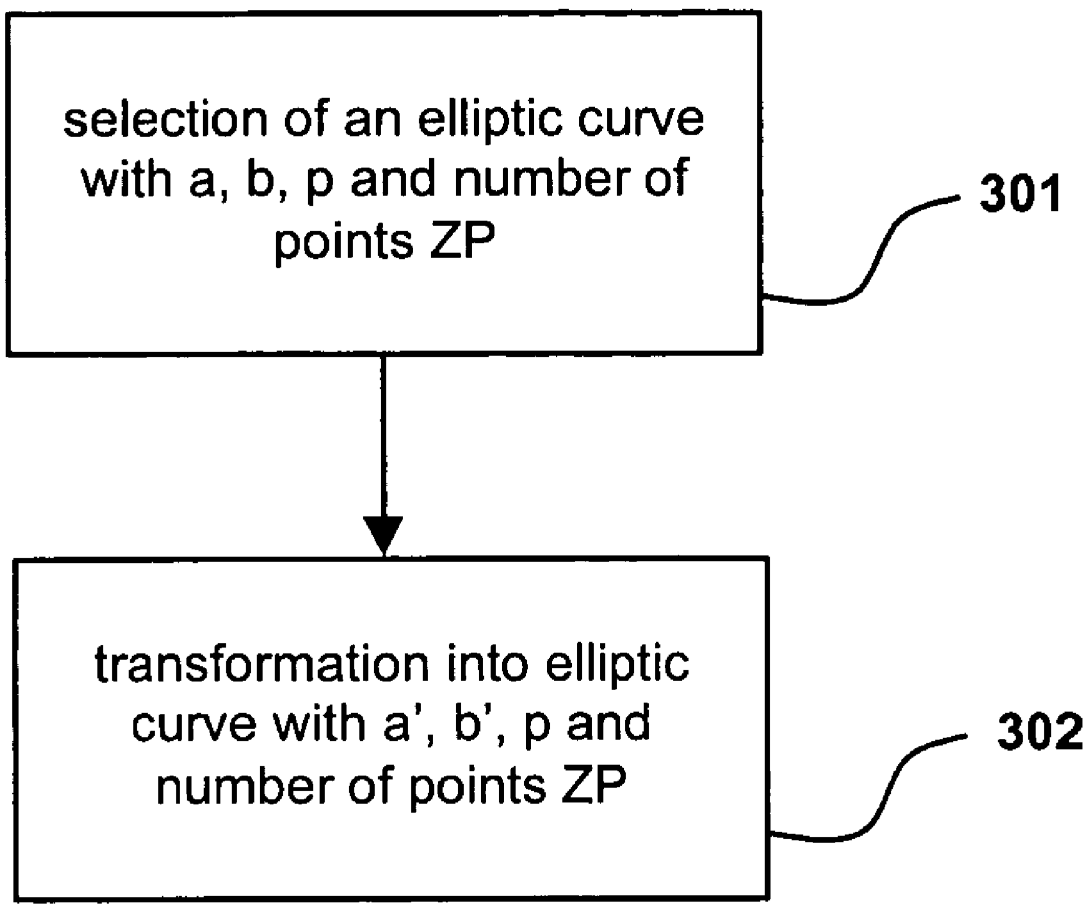
FIG. 3 is a flowchart showing a method for determining an elliptic curve and subsequent transformation into the second form.

An elliptic curve with the parameters a, b, p and a number of points ZP is determined in accordance with Equation (1) in a first step 301 in FIG. 3. The elliptic curve is transformed in a step 302 (compare Equation (2)). After the transformation, the elliptic curve comprises the parameters a', b', p and ZP. a' and b' indicate that the parameters a and b have been changed, one parameter, preferably the parameter a' being short by comparison with the parameter a, such that memory space is saved by storing the parameter a' instead of the parameter a as a characteristic of the elliptic curve.

Referring now to FIG. 4, there is shown, in diagrammatic form, a system for cryptographic processing. A portable medium 401, preferably a chip card, comprises an (insecure) memory area MEM 403 and a protected (secure) memory area SEC 402. Data are exchanged between the medium 401 and a computer network 406 by a channel 405 with the aid of an interface IFC 404. The computer network 406 comprises several computers, which are interconnected and intercommunicate. Data for operating the portable medium 401 are preferably available in a distributed fashion in the computer network RN 406.

The protected memory area 402 is designed to be unreadable. The data of the protected memory area 402 are used with the aid of an arithmetic-logic unit which is accommodated on the portable medium 401 or in the computer network 406. A comparative operation can therefore specify as result whether a comparison of an input with a key in the protected memory area 402 was successful or not.

The parameters of the elliptic curve are stored in the protected memory area 402 or in the unprotected memory area 403. In particular, a secret or private key is stored in the protected memory area, and a public key is stored in the insecure memory area.

An arithmetic-logic unit 501 is illustrated in FIG. 5. The arithmetic-logic unit 501 comprises a processor CPU 502, a memory 503 and an input/output interface 504 which is used in different ways via an interface 505 led out of the arithmetic-logic unit 501: an output on a monitor 507 is visualized via a graphics interface, and/or output on a printer 508. An input is performed via a mouse 509 or a keyboard 510. The arithmetic-logic unit 501 also has a bus 506 which ensures the connection between the memory 503, processor 502 and input/output interface 504. It is also possible to connect additional components with the bus 506: additional memory, fixed disk, etc.

The term "computer-readable medium," as used in this text, includes any kind of computer memory such as floppy disks, removable disks, hard disks, CD-ROMS, flash ROMs, non-volatile ROMs, and RAM.

We claim:

1. A method of cryptographic processing on a computer, which comprises the steps of:

prescribing an elliptic curve in a first form, the elliptic curve having a plurality of first parameters;

transforming the elliptic curve into a second form $$y^2=x^3+c^4ax+c^6b$$

by determining a plurality of second parameters, wherein at least one of the second parameters is shortened in length by comparison with the first parameter;

wherein x,y are variables;

a,b are the first parameters; and c is a constant;

wherein at least the parameter a is shortened by selecting the constant c such that $c^4a \bmod p$ is determined to be significantly shorter than a length of the parameter b and the length of the prescribed variable p; and determining the elliptic curve in the second form for cryptographic processing.

2. The method according to claim 1, wherein the first form of the elliptic curve is defined by $y^2=x^3+ax+b$.

3. The method according to claim 1, which comprises carrying out cryptographic encoding.

4. The method according to claim 1, which comprises carrying out cryptographic decoding.

5. The method according to claim 1, which comprises carrying out key allocation.

6. The method according to claim 1, which comprises carrying out a digital signature.

7. The method according to claim 6, which comprises carrying out a verification of the digital signature.

8. The method according to claim 1, which comprises carrying out an asymmetrical authentication.

9. In a device for cryptographic processing, a processor unit programmed to:

prescribe an elliptic curve in a first form, with a plurality of first parameters determining the elliptic curve;

transform the elliptic curve into a second form $$y^2=x^3+c^4ax+c^6b$$

by determining a plurality of second parameters, at least one of the second parameters being shortened in length by comparison with the first parameter;

wherein x,y are variables;

a,b are the first parameters; and c is a constant;

wherein at least the parameter a is shortened by selecting the constant c such that $c^4a \bmod p$ can be determined to be much shorter than the length of the parameter b and the length of the prescribed variable p; and determine the elliptic curve in the second form for the purpose of cryptographic processing.

10. The device according to claim 9, wherein the device is embodied as a chip card with a memory area, the memory area being adapted to store the parameters of the elliptic curve.

11. The device according to claim 10, wherein the chip card has a protected memory area adapted to store a secret key.

12. A computer-readable medium having computer-executable instructions for performing a cryptographic processing method which comprises the steps of:

prescribing an elliptic curve in a first form, the elliptic curve having a plurality of first parameters;

transforming the elliptic curve into a second form $$y^2=x^3+c^4ax+c^6b$$

by determining a plurality of second parameters, wherein at least one of the second parameters is shortened in length by comparison with the first parameter;

wherein $x,y$ are variables;

$a,b$ are the first parameters; and $c$ is a constant;

wherein at least the parameter a is shortened by selecting the constant c such that $c^4a \bmod p$ is determined to be significantly shorter than a length of the parameter b and the length of the prescribed variable p; and determining the elliptic curve in the second form for cryptographic processing.

13. The computer-readable medium according to claim 12, wherein the first form of the elliptic curve is defined by $y^2=x^3+ax+b$.

* * * * *